United States Patent
Feng et al.

(10) Patent No.: US 11,210,796 B2
(45) Date of Patent: Dec. 28, 2021

(54) IMAGING METHOD AND IMAGING CONTROL APPARATUS

(71) Applicant: SZ DJI TECHNOLOGY CO., LTD., Shenzhen (CN)

(72) Inventors: Xuyang Feng, Shenzhen (CN); Cong Zhao, Shenzhen (CN); Junfeng Yu, Shenzhen (CN); Jie Qian, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 81 days.

(21) Appl. No.: 16/564,993

(22) Filed: Sep. 9, 2019

(65) Prior Publication Data

US 2019/0392597 A1    Dec. 26, 2019

Related U.S. Application Data

(63) Continuation of application No. PCT/CN2017/076794, filed on Mar. 15, 2017.

(51) Int. Cl.
*G06T 7/33* (2017.01)
*G06T 7/73* (2017.01)
(Continued)

(52) U.S. Cl.
CPC ............... *G06T 7/337* (2017.01); *G06T 3/20* (2013.01); *G06T 3/60* (2013.01); *G06T 7/74* (2017.01); *G06T 2207/30201* (2013.01)

(58) Field of Classification Search
CPC .. G06T 7/337; G06T 7/74; G06T 3/20; G06T 3/60; G06T 2207/30201; H04N 5/23219;
(Continued)

(56) References Cited

U.S. PATENT DOCUMENTS

2008/0279425 A1* 11/2008 Tang ................. G06K 9/00221
382/118
2009/0115855 A1    5/2009 Gotoh et al.
(Continued)

FOREIGN PATENT DOCUMENTS

CN    101639610 A    2/2010
CN    103179353 A    6/2013
(Continued)

OTHER PUBLICATIONS

The World Intellectual Property Organization (WIPO) International Search Report and written opinion for PCT/CN2017/076794 dated Dec. 4, 2017 7 pages.

*Primary Examiner* — Chan S Park
*Assistant Examiner* — Daniel C Chang
(74) *Attorney, Agent, or Firm* — Anova Law Group, PLLC

(57) ABSTRACT

An imaging method includes determining a target position in an imaging frame of an image capturing mechanism connected with a positioning mechanism, outputting a capturing instruction to control the image capturing mechanism to capture a scene including a human face after the target position is determined, detecting the human face from the captured scene, and outputting a control instruction to position the detected human face at the target position by moving the positioning mechanism to move the image capturing mechanism.

17 Claims, 5 Drawing Sheets

(51) Int. Cl.
*G06T 3/20* (2006.01)
*G06T 3/60* (2006.01)

(58) Field of Classification Search
CPC ............ H04N 5/2328; H04N 5/23254; H04N 5/23287; H04N 5/232933; H04N 5/23299; G06K 9/00261; G06K 9/3233; G06K 9/6201; G06K 9/00228
See application file for complete search history.

(56) References Cited

U.S. PATENT DOCUMENTS

| | | |
|---|---|---|
| 2010/0277614 A1 | 11/2010 | Chiu |
| 2011/0008036 A1* | 1/2011 | Takatsuka ............ G03B 15/00 396/283 |
| 2011/0216943 A1* | 9/2011 | Ogawa ............... H04N 5/23219 382/103 |
| 2013/0124207 A1* | 5/2013 | Sarin ..................... G06F 3/167 704/275 |
| 2014/0139667 A1 | 5/2014 | Kang |
| 2016/0134803 A1 | 5/2016 | Deng |

FOREIGN PATENT DOCUMENTS

| | | | |
|---|---|---|---|
| CN | 103220466 A | | 7/2013 |
| CN | 103384301 A | | 11/2013 |
| CN | 104866806 A | | 8/2015 |
| CN | 105592267 A | * | 5/2016 |
| CN | 105592267 A | | 5/2016 |
| JP | 2008004061 A | * | 1/2008 |

\* cited by examiner

IMAGING METHOD AND IMAGING CONTROL APPARATUS

CROSS-REFERENCE TO RELATED APPLICATION

This application is a continuation of International Application No. PCT/CN2017/076794, filed Mar. 15, 2017, the entire content of which is incorporated herein by reference.

TECHNICAL FIELD

The present disclosure relates to a method and apparatus for imaging and, more particularly, to an imaging method and imaging control apparatus based on face detection.

BACKGROUND

Image capturing devices, such as cameras and camcorders, have been widely used in daily life. On conventional image capturing devices, a scene to be captured can be viewed through a viewfinder or on a pre-view screen. However, the view finder or the pre-view screen is usually arranged on a side of the image capturing device that is opposite to a pointing direction of a lens of the image capturing device. This makes it a difficult task to take a selfie, e.g., a selfie photo or a selfie video. Some image capturing devices have a rotatable pre-view screen, which allows a user to preview an image with the user him/herself in the image. However, the user still needs to manually adjust the image capturing device.

Many smartphones also include one or more lens and are capable of taking both still images and moving images, and thus also can function as image capturing devices. A smartphone usually has a front camera arranged on a same side as a screen of the smartphone and a rear camera arranged on an opposite side of the smartphone. Usually the front camera has a lower resolution than the rear camera. Using the rear camera to take selfies is difficult because the user cannot pre-view the image before it is captured. Using the front camera to take selfies is relatively more convenient but still requires manual adjustment by the user to obtain a proper composition, which is often cumbersome and not easy to do, especially when taking a selfie video while moving. Further, the front camera often can produce merely acceptable images due to its relatively low resolution.

SUMMARY

In accordance with the present disclosure, there is provided an imaging method including determining a target position in an imaging frame of an image capturing mechanism connected with a positioning mechanism, outputting a capturing instruction to control the image capturing mechanism to capture a scene including a human face after the target position is determined, detecting the human face from the captured scene, and outputting a control instruction to position the detected human face at the target position by moving the positioning mechanism to move the image capturing mechanism.

Also in accordance with the present disclosure, there is provided an imaging control apparatus including a processor and a memory storing computer program codes that, when executed by the processor, cause the processor to determine a target position in an imaging frame of an image capturing mechanism connected with a positioning mechanism, output a capturing instruction to control the image capturing mechanism to capture a scene including a human face after the target position is determined, detect the human face from the captured scene, and output a control instruction to move the positioning mechanism so as to position the detected human face at the target position.

Also in accordance with the present disclosure, there is provided a non-transitory computer-readable storage medium storing computer program codes that, when executed by a processor, cause the processor to determine a target position in an imaging frame of an image capturing mechanism connected with a positioning mechanism, output a capturing instruction to control the image capturing mechanism to capture a scene including a human face after the target position is determined, detect the human face from the captured scene, and output a control instruction to move the positioning mechanism so as to position the detected human face at the target position.

DESCRIPTION OF THE EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

Figure 1:
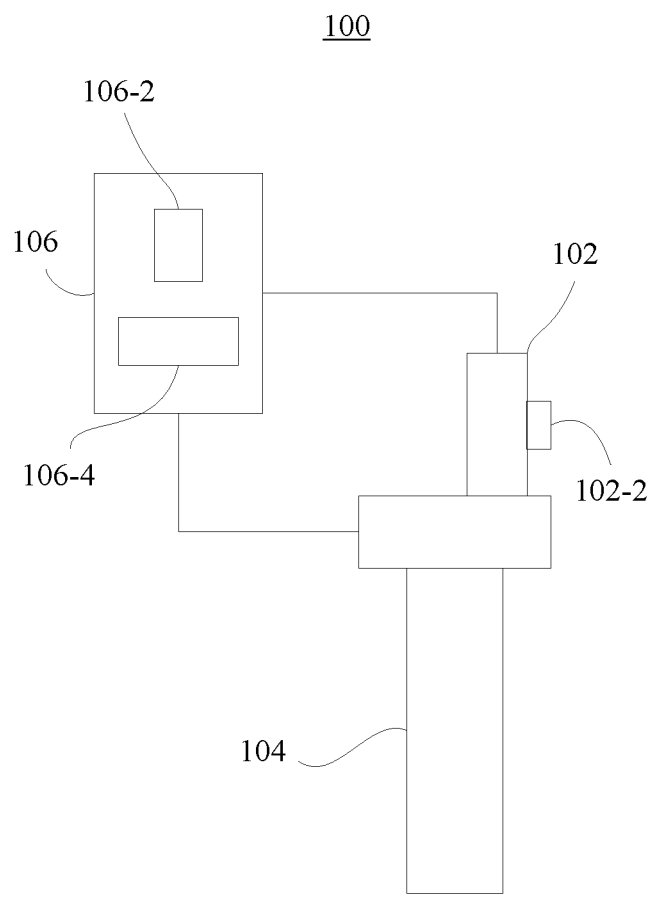
FIG. 1 is a schematic diagram showing an imaging system according to an exemplary embodiment of the disclosure.

FIG. 1 is a schematic diagram showing an exemplary imaging system 100 consistent with the disclosure. The imaging system 100 includes an image capturing mechanism 102, a positioning mechanism 104 connected with the image capturing mechanism 102, and an imaging control apparatus 106 coupled to the image capturing mechanism 102 and the positioning mechanism 104.

The image capturing mechanism 102 includes a lens or a lens set 102-2, and is configured to capture still images, i.e., pictures, and/or moving images, i.e., videos, using an image sensor (not shown). Hereinafter, the term "image" is used to refer to either a still image or a moving image. The image sensor can be, for example, an opto-electronic sensor, such as a charge-coupled device (CCD) sensor, a complementary metal-oxide-semiconductor (CMOS) sensor, or a thin-film transistor (TFT) sensor. The image capturing mechanism 102 is further configured to transmit the captured images to the imaging control apparatus 106 for processing. In some embodiments, the image capturing mechanism 102 may include a memory (not shown) for storing, either temporarily or permanently, the captured images.

The positioning mechanism 104 is configured to move the image capturing mechanism 102 to, for example, point to a target scene for imaging, e.g., a scene or view for which an image is to be taken, at a proper angle and/or a proper distance. In some embodiments, the positioning mechanism 104 may include one or more rotation drivers configured to rotate about one or more rotation axes, such as a yaw axis, a pitch axis, and/or a roll axis. In some embodiments, the positioning mechanism 104 may additionally or alternatively include one or more translation drivers configured to move translationally along one or more directions, such as an x-direction, a y-direction, and/or a z-direction in a coordinate system defined on the positioning mechanism 104.

The imaging control apparatus 106 is configured to control the operation of the image capturing mechanism 102 and/or the positioning mechanism 104. For example, the imaging control apparatus 106 can be configured to receive images captured by the image capturing mechanism 102, process the captured images to generate control instructions for the positioning mechanism 104, and send the control instructions to the positioning mechanism 104. In some embodiments, as shown in FIG. 1, the imaging control apparatus 106 includes a processor 106-2 and a memory 106-4. The processor 106-2 can include any suitable hardware processor, such as a microprocessor, a micro-controller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component. The memory 106-4 stores computer program codes that, when executed by the processor 106-2, control the processor 106-2 to perform a method consistent with the disclosure, such as one of the exemplary methods described below. The memory 106-4 can include a non-transitory computer-readable storage medium, such as a random access memory (RAM), a read only memory, a flash memory, a volatile memory, a hard disk storage, or an optical media.

In some embodiments, the imaging system 100 can further include a human-machine interface (not shown) configured to deliver information to a user of the imaging system 100 and/or receive input from the user. In some embodiments, the human-machine interface can include a screen for displaying images captured by the image capturing mechanism 102 and/or other information and an input device for receiving input from the user. In some embodiments, the screen can include a touch panel for receiving the user input. The human-machine interface can be arranged on or associated with any one of the image capturing mechanism 102, the positioning mechanism 104, and the imaging control apparatus 106.

According to the disclosure, the image capturing mechanism 102, the positioning mechanism 104, and the imaging control apparatus 106 can be separate devices, or any two or more of them can be integrated in one device. In some embodiments, the image capturing mechanism 102, the positioning mechanism 104, and the imaging control apparatus 106 are separate devices that can be connected or coupled to each other. For example, the image capturing mechanism 102 can be a camera, a camcorder, or a smartphone having a camera function. The positioning mechanism 104 can be, e.g., a camera holder (such as a tripod), a handheld gimbal, or an onboard gimbal configured to be mounted on a mobile vehicle (such as an unmanned aerial vehicle (UAV)). The imaging control apparatus 106 can be, e.g., an electronic control device coupled to the image capturing mechanism 102 and the positioning mechanism 104 through wired or wireless means. When the positioning mechanism 104 is an onboard gimbal configured to be mounted on a mobile vehicle, the imaging control apparatus 106 can be arranged in a remote controller of the mobile vehicle.

In some embodiments, any two of the image capturing mechanism 102, the positioning mechanism 104, and the imaging control apparatus 106 can be integrated in a same device. For example, the image capturing mechanism 102 and the positioning mechanism 104 may be parts of a same imaging device, such as a camera, a camcorder, or a smartphone, that has a lens or a lens set and a driving part configured to move the lens. The image capturing mechanism 102 can include the lens or the lens set and the positioning mechanism 104 can include the driving part. In this example, the imaging device can include an electrical interface for coupling with the imaging control apparatus 106. As another example, the image capturing mechanism 102 and the imaging control apparatus 106 may be parts of a same imaging device, such as a camera, a camcorder, or a smartphone. In this example, the image capturing mechanism 102 can include a lens or a lens set of the imaging device, and the imaging control apparatus 106 can include a control circuit of the imaging device for controlling the operation of the lens or lens set and/or any other parts of the imaging device. The imaging device can further include an electrical interface (either wired or wireless) for coupling with the positioning mechanism 104 and/or a mechanical interface for physically connecting to the positioning mechanism 104. As a further example, the positioning mechanism 104 and the imaging control apparatus 106 may be parts of a same holding device, such as a camera holder, a handheld gimbal, or an onboard gimbal. In this example, the holding device can include an electrical interface (either wired or wireless) for coupling with the image capturing mechanism 102 and/or a mechanical interface for physically connecting to the image capturing mechanism 102.

In some embodiments, the image capturing mechanism 102, the positioning mechanism 104, and the imaging control apparatus 106 are integrated in a same electronic device. The image capturing mechanism 102 may include a lens or a lens set of the electronic device. The positioning mechanism 104 may include a driving part of the electronic device that is configured to move the lens or the lens set. The imaging control apparatus 106 may include a control circuit of the electronic device that is configured to control the operation of the lens or the lens set, the driving part, and/or any other parts of the electronic device. For example, the electronic device may be a smartphone having a rotatable/movable lens or lens set connected to a driving part, and the control circuit of the electronic device may control the lens or lens set to capture images and may control the driving part to rotate/move the lens or lens set.

Exemplary methods for controlling imaging consistent with the disclosure will be described in more detail below. A method consistent with the disclosure can be implemented in an imaging system consistent with the disclosure, such as the imaging system 100 described above.

Figure 2:
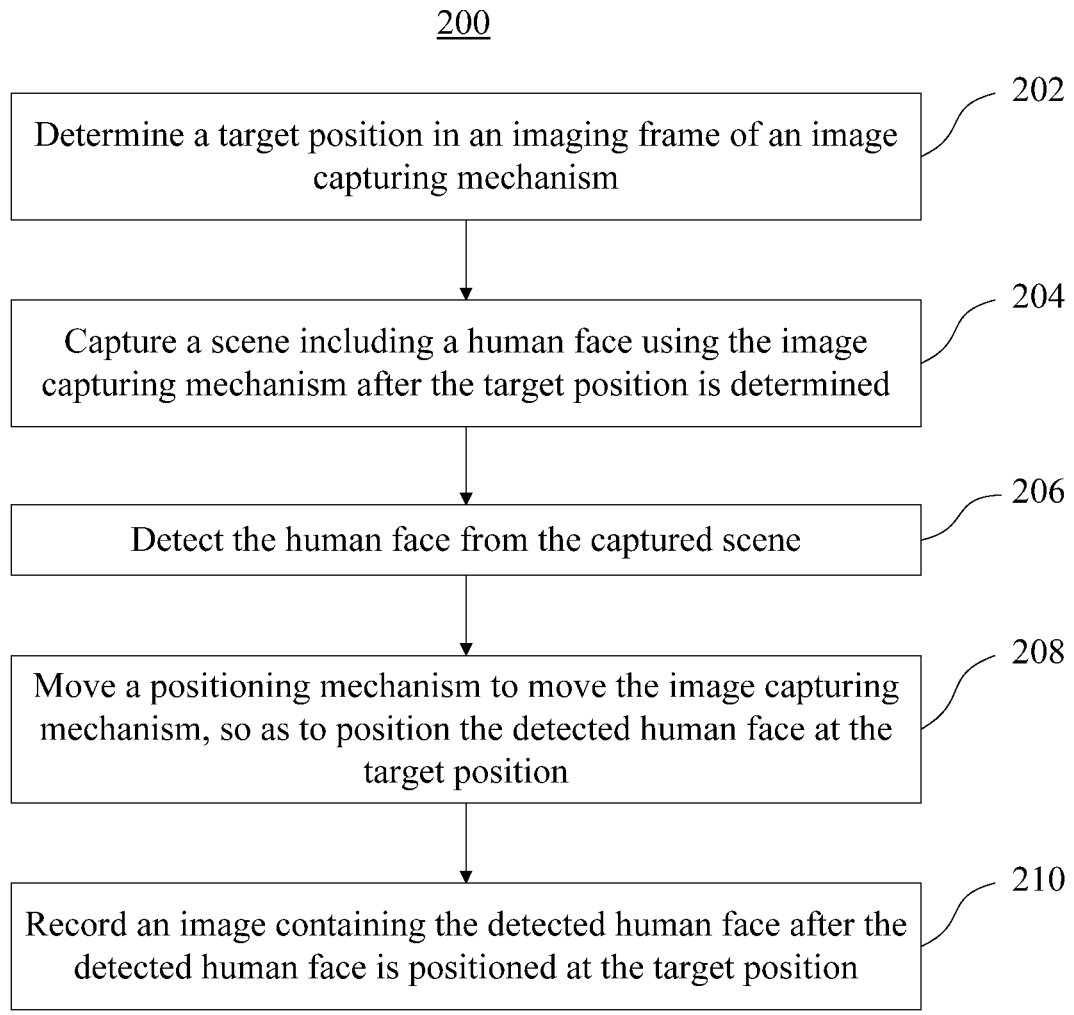
FIG. 2 is a flow chart showing an imaging method according to an exemplary embodiment of the disclosure.

FIG. 2 is a flow chart showing an exemplary imaging method 200 consistent with the disclosure. According to the imaging method 200, a positioning mechanism, such as the positioning mechanism 104 described above, can be controlled to move an image capturing mechanism, such as the image capturing mechanism 102 described above, to a certain attitude, angle, and/or position such that a human face can be positioned in an image captured by the image capturing mechanism as desired. An imaging control apparatus, such as the imaging control apparatus 106 described above, can receive and process data from the image capturing mechanism, and control the positioning mechanism 104 according to the processing results. More specifically, the imaging control apparatus can determine a target position in an imaging frame of the image capturing mechanism, control the image capturing mechanism to capture a scene including a human face after the target position is determined, detect the human face from the captured scene, and control the positioning mechanism to move the image capturing mechanism so as to position the detected human face at the target position. The term "human face," as used in the disclosure, may refer to a single human face or a group of human faces. Exemplary processes are described below in detail.

As shown in FIG. 2, at 202, the target position in the imaging frame of the image capturing mechanism is determined. The image capturing mechanism can be physically connected with the positioning mechanism, such that the positioning mechanism can drive the image capturing mechanism to move. The imaging frame of the image capturing mechanism can refer to, for example, a virtual frame corresponding an image to be captured by the image capturing mechanism, and can correspond to, e.g., a region on a photo sensor of the image capturing mechanism that has the same shape as the image to be captured by the image capturing mechanism. For example, the imaging frame can correspond to an entire area of an image captured by the image capturing mechanism. Thus, the imaging frame of the image capturing mechanism can define the dimensions of an image captured by the image capturing mechanism. For example, the imaging frame can be a rectangular frame with a ratio of a long side of the frame to a short side of the frame being, e.g., 5:4, 3:2, or 16:9. As another example, the imaging frame can be a square frame. The imaging frame can also have a shape and/or dimensions different from common frames, such as a circular frame, a triangular frame, or a frame having an irregular shape. The images captured by the image capturing mechanism can have a shape and dimensions that are same as those of the imaging frame.

Figure 3:
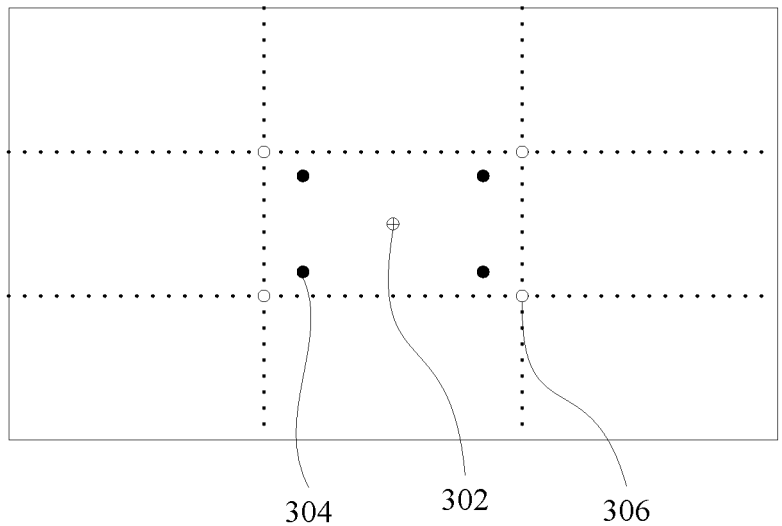
FIG. 3 schematically shows default target positions in an imaging frame according to exemplary embodiments of the disclosure.

The target position refers to a predetermined position in the imaging frame at which a target human face is positioned in an image to be captured by the image capturing mechanism, and can be determined before the image capturing mechanism starts to capture the image. In some embodiments, the target position can be a preset default position in the imaging frame. The default position can be preset and stored, for example, in the image capturing mechanism or the imaging control apparatus. FIG. 3 schematically shows some exemplary default positions in an exemplary imaging frame 300 consistent with the disclosure. The default position can be, for example, a center position 302 of the imaging frame or a position close to the center position 302, one of the golden ratio points 304 of the imaging frame or a position close to one of the golden ratio points 304, or one of the rule-of-thirds grid points 306 of the imaging frame or a position close to one of the rule-of-thirds grid points 306.

In some embodiments, the target position can be determined by a user before capturing any images. In these embodiments, a human-machine interface can be provided for the user to select a position in the imaging frame as the target position. As described above, the human-machine interface can be arranged on or associated with any one of the image capturing mechanism, the positioning mechanism, and the imaging control apparatus. Specifically, the human-machine interface can include a screen and the imaging frame can be displayed on the screen. The imaging frame can occupy a portion of the screen or the entire screen.

In some embodiments, the human-machine interface can further include a separate input device for the user to input a selection indicating the target position in the imaging frame. For example, the input device can include one or more direction keys or a pointing device (such as a joystick, a trackpoint, a trackball, or a touchpad) for controlling the movement of a cursor on the screen and a confirm button for selecting the position of the cursor as the target position.

In some embodiments, the screen is a touch screen and the user can directly select the target position by touching the screen. The user can touch the screen with an external object, such as a finger of the user or a stylus. When detecting a touch by the external object on the screen, the imaging control apparatus can determine a position of the touch, i.e., a touching position, and can determine the target position according to the touching position. For example, the imaging control apparatus can select the touching position as the target position.

In some embodiments, the touch can include a quick click on the screen and the touching position includes the position at which the external object clicks on the screen. In some embodiments, to avoid accidentally selecting an undesired position for the target position, the user may be required to touch the screen for a period of time before the position selection input is recognized by the imaging control apparatus. In these embodiments, the touch can include a press on the screen and hold for the period of time, such as 2 seconds. In some embodiments, when the period of time has elapsed, the imaging control apparatus can output a prompt to inform the user that the target position has been selected. The prompt can be a graphic prompt, such as a small circle around the touching position, or a sound prompt, such as a beep sound.

In some embodiments, the imaging control apparatus does not determine the target position when detecting the external object touches the screen, but when detecting the external object leaves the screen. The position from which the external object leaves, i.e., un-touches, the screen is also referred to as a "releasing position." The releasing position may be the same as the touching position, for example, if the external object does not move on the screen after touching the screen and before leaving the screen. The releasing position may also be different from the touching position, for example, if the external object moves away from the touching position after touching the screen. In these embodiments, the imaging control apparatus can determine the target position according to the releasing position. For example, the imaging control apparatus can select the releasing position as the target position.

Similar to the embodiments described above in which the target position is determined according to the touching position, in the embodiments that determine the target position according to the releasing position, to avoid accidentally selecting an undesired position for the target position, the user may also be required to touch the screen for a period of time before the user can release or move the external object. For example, the user may need to press on the screen and hold for the period of time, such as 2 seconds, and then can either un-touch the screen or move the external object on the screen. In some embodiments, when the period of time has elapsed, the imaging control apparatus can output a prompt to inform the user that the user can un-touch the screen or can start to move the external object. The prompt can be a graphic prompt, such as a small circle around the touching position, or a sound prompt, such as a beep sound.

The selection of the target position does not necessarily require the user directly indicate a position in the imaging frame as the target position, but can be based on past experience of the user or of someone else. In some embodiments, one or more sample images each containing at least one sample face image can be used for determining the target position. The one or more sample images can be, for example, one or more photos taken by the user in the past and/or one or more photos taken by other people, such as professional photographers. The one or more sample images can be stored in a memory of the imaging system, which can be arranged in or coupled to one of the image capturing mechanism, the positioning mechanism, and the imaging control apparatus. In some embodiments, the one or more sample images may be stored in a remote server. The imaging system may have a network function and can retrieve the one or more sample images from the remote server when or before it needs to select the target position.

In some embodiments, the imaging control apparatus can determine the target position based on one sample image containing one sample face. In these embodiments, the imaging control apparatus can receive the sample image from the memory or the remote server, and detect a position of the sample face in the sample image. According to the position of the sample face, the imaging control apparatus can determine the target position. For example, the imaging control apparatus can determine the position of the sample face as the target position. As another example, the imaging control apparatus can determine a position within a certain area covering the sample face as the target position.

In some embodiments, the imaging control apparatus can determine the target position based on a plurality of sample images each containing a sample face. In these embodiments, the imaging control apparatus can receive the sample images from the memory or the remote server, and detect a position of the sample face in each of the sample images. According to the positions of the sample faces, the imaging control apparatus can calculate the target position. For example, the imaging control apparatus can calculate an average position based on the positions of the sample faces and determine the target position according to the average position, such as determining the average position as the target position or determining a position within a certain area covering the average position as the target position. The average position can be a direct arithmetic average of the positions of the sample faces, or a weighted average of the positions of the sample faces. In calculating the weighted average, different sample faces can be assigned different weights. For example, a larger weight may be assigned to a sample face closer to the center of the sample image.

In some embodiments, the imaging control apparatus can determine the target position based on one sample image containing a plurality of sample faces. In these embodiments, the imaging control apparatus can receive the sample image from the memory or the remote server, and detect positions of the sample faces. The determination of the target position according to the detected positions of the sample faces is similar to that in the exemplary methods described above using a plurality of sample images each containing a sample face, and thus detailed description thereof is omitted here.

The one or more sample images may be preset by default, or be selected by the user. In some embodiments, a plurality of images can be displayed on the screen and a user input can be received to select the one or more sample images. The selected one or more sample images can then be used to determine the target position according to one of the exemplary methods described above.

In some embodiments, instead of the one or more sample images each containing at least one sample face, one or more composition templates each containing at least one face position can be used to determine the target position. Similar to the one or more sample images, the one or more composition templates can be stored in a memory of the imaging system or in a remote server, and can be received by the imaging control apparatus when or before determining the target position. Also, the determination of the target position using the one or more composition templates can be similar to the determination of the target position using the one or more sample images, except that the face position may be defined in the composition template and an additional step to determine the position of a face may not be needed.

For example, the imaging control apparatus can receive a composition template containing a face position and determine the face position as the target position. As another example, the imaging control apparatus can receive a plurality of composition templates each containing a face position, receive an input selecting one of the composition templates, and determine the face position of the selected composition template as the target position.

Referring again to FIG. 2, at 204, the scene including the human face is captured using the image capturing mechanism. The scene can be captured after the target position is determined. In some embodiments, after the target position is determined, the imaging control apparatus can output a capturing instruction to control the image capturing mechanism to capture the scene including the human face. The human face can be, for example, the face of the user or the face of another person. In some embodiments, capturing the scene can be performed in the background, i.e., without showing the captured scene to the user by, for example, displaying on a screen. That is, the lens or lens set of the image capturing mechanism can project the scene onto the image sensor of the image capturing mechanism. The image sensor can convert the received light into electronic signals representing the scene and directly send the electronic signals to the imaging control apparatus for further processing. In some embodiments, the captured scene can be displayed on a screen and the user can see where the human face of the scene is located in the imaging frame.

At 206, the human face is detected from the captured scene. In some embodiments, the scene only contains one human face and the one human face is detected for further processing. In some embodiments, a plurality of candidate faces are detected from the captured scene and one or more of the candidate faces can be determined as the detected human face. Determining the detected human face from the plurality of candidate faces can be performed using any suitable method. For example, the candidate faces can be compared with a stored user face and one of the candidate faces that matches the stored user face can be determined as the detected human face. The stored user face can be registered in advance by, e.g., taking a photo of the user, such as the owner of the imaging system, and storing the photo containing the user's face in the memory of the imaging system. Registration of the user face can be performed, e.g., when the user starts to use the imaging system for the first time. As another example, the scene containing the plurality of candidate faces can be displayed on the screen of the imaging system and the user can select a desired one of the candidate faces as the detected human face by, e.g., clicking on the screen at a position corresponding to the desired candidate face. In some embodiments, the imaging control apparatus may be incapable of detecting the desired human face and the user can select the desired human face from the scene displayed on the screen as the detected human face.

In some embodiments, to improve the imaging control apparatus's capability of detecting human faces, an algorithm implemented in the imaging control apparatus can be "trained" using a plurality of sample human faces. In some embodiments, the algorithm can be trained to be particularly suitable for detecting side faces using a plurality of sample side faces. As such, even when the user turns his/her face, the face can still be detected and tracked with a high accuracy.

At 208, the positioning mechanism is moved to move the image capturing mechanism, so as to position the detected human face at the target position. In some embodiments, the imaging control apparatus can output a control instruction to move the positioning mechanism so as to position the detected human face at the target position. In some embodiments, a facial feature, such as an eye, a nose, an ear, or a mouth, of the detected human face, can be positioned at the target position. A detailed process for determining how to move the positioning mechanism and for moving the positioning mechanism is described below.

Figure 4:
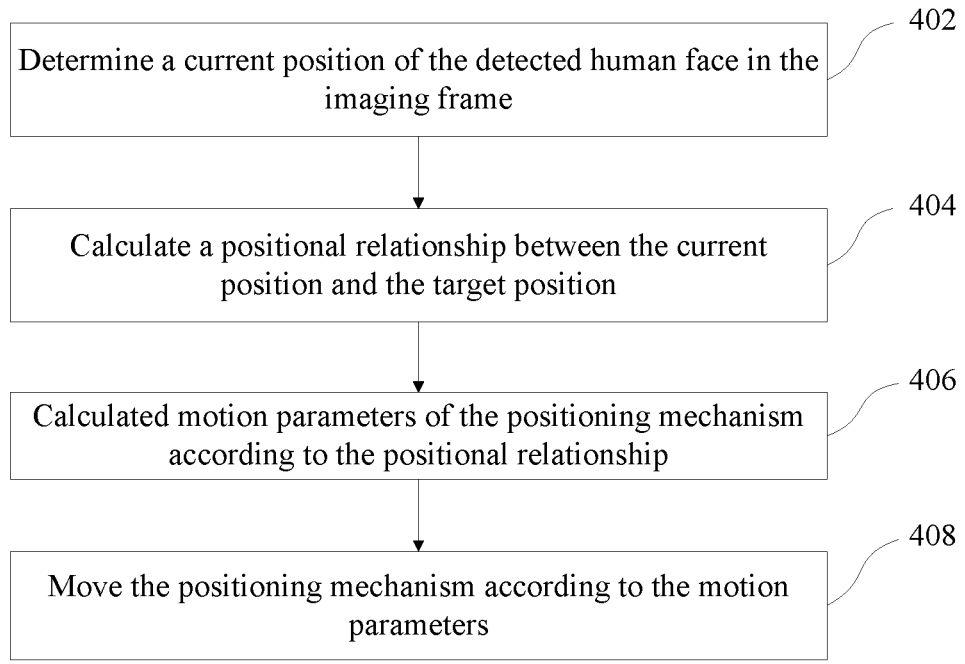
FIG. 4 is a flow chart showing a method for moving a positioning mechanism to position a detected human face at a target position according to an exemplary embodiment of the disclosure.

FIG. 4 is a flow chart showing an exemplary method 400 for moving the positioning mechanism to position the detected human face at the target position consistent with the disclosure. The method 400 can be implemented, for example, in the imaging control apparatus. As shown in FIG. 4, at 402, a current position of the detected human face in the imaging frame is determined. At 404, a positional relationship between the current position and the target position is calculated. At 406, one or more motion parameters of the positioning mechanism are calculated according to the positional relationship. At 408, the positioning mechanism is moved according to the motion parameters.

Figure 5A:
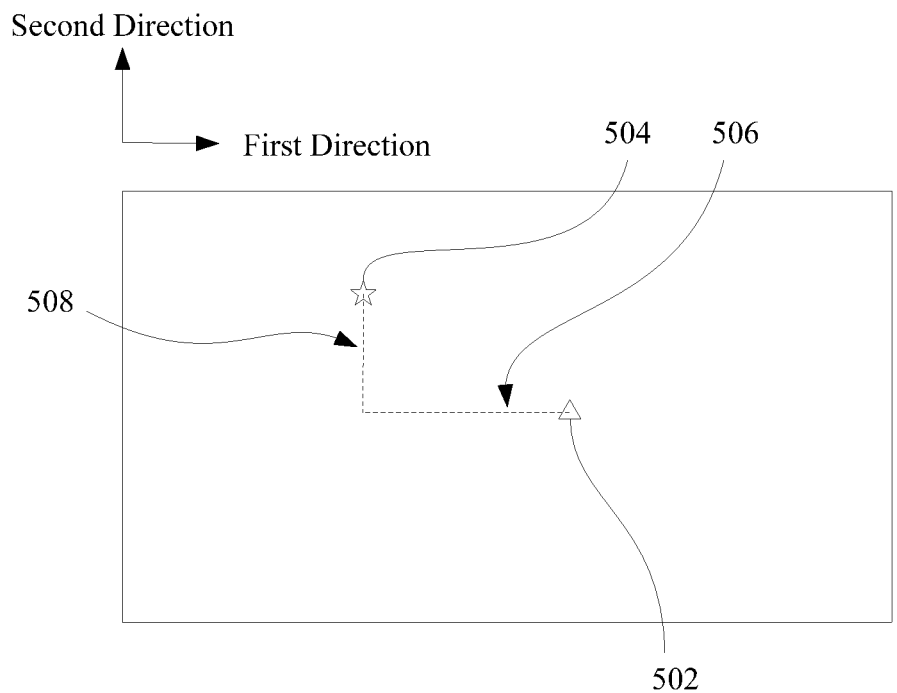
FIGS. 5A and 5B schematically illustrate positional relationships between a current position and the target position according to exemplary embodiments of the disclosure.

In some embodiments, the positional relationship between the current position and the target position calculated at 404 can include a relative displacement between the current position and the target position in the imaging frame. The relative displacement can be represented by, for example, a first distance between the current position and the target position along a first direction in the imaging frame and a second distance between the current position and the target position along a second direction in the imaging frame that is different from the first direction. FIG. 5A schematically shows an imaging frame illustrating an exemplary positional relationship between the current position and the target position consistent with the disclosure. As shown in FIG. 5A, the current position 502 and the target position 504 are spaced apart from each other for the first distance 506 along the first direction, and are spaced apart from each other for the second distance 508 along the second direction. In the example shown in FIG. 5A, both the first distance and the second distance are non-zero. In some other embodiments, either or both of the first distance and the second distance can be zero.

The first direction in the imaging frame may correspond to a first rotation direction and/or a first translation direction of the positioning mechanism, and the second direction in the imaging frame may correspond to a second rotation direction and/or a second translation direction of the positioning mechanism. Thus, in these embodiments, the one or more motion parameters of the positioning mechanism calculated at 406 can include, for example, at least one first motion parameter of the positioning mechanism calculated according to the first distance in the imaging frame and at least one second motion parameter of the positioning mechanism calculated according to the second distance in the imaging frame. The at least one first motion parameter and the at least one second motion parameter can both have non-zero values, but either or both of the at least one first motion parameter and the at least one second motion parameter can have a value of zero when the corresponding one or both of the first and second distances are zero. In some embodiments, calculating the one or more motion parameters at 406 can include calculating the motion parameter corresponding to one or both of the first and second distances that have non-zero values.

In some embodiments, the at least one first motion parameter can include at least one of a first rotation angle of the positioning mechanism in the first rotation direction or a first translational movement distance of the positioning mechanism in the first translation direction. The at least one second motion parameter can include at least one of a second rotation angle of the positioning mechanism in the second rotation direction or a second translational movement distance of the positioning mechanism in the second translation direction.

In some embodiments, the first direction and the second direction are the u-direction and the v-direction, respectively, in a coordinate system defined on the imaging frame, also referred to as an "imaging frame coordinate system." Correspondingly, the first rotation direction and the second rotation direction can correspond to a rotation around a yaw axis and a rotation around a pitch axis, respectively, of the positioning mechanism. The yaw axis and the pitch axis can be an axis corresponding to the u-direction in the imaging frame coordinate system and an axis corresponding to the v-direction in the imaging coordinate system, respectively, and can be parallel to the x-direction and the y-direction, respectively, in a coordinate system defined on the positioning mechanism, also referred to as a "positioning mechanism coordinate system." Further, the first and second translation directions can be parallel to the x-direction and the y-direction in the positioning mechanism coordinate system, respectively. In these embodiment, the at least one first motion parameter can include at least one of the first rotation angle of the positioning mechanism around the yaw axis or the first translational movement distance of the positioning mechanism in the x-direction in the positioning mechanism coordinate system. Similarly, the at least one second motion parameter can include at least one of the second rotation angle of the positioning mechanism around the pitch axis or the second translational movement distance of the positioning mechanism in the y-direction in the positioning mechanism coordinate system.

That is, in these embodiments, calculating the one or more motion parameters of the positioning mechanism (406 in FIG. 4) can include calculating at least one of the first rotation angle or the first translational movement distance according to the first distance and calculating at least one of the second rotation angle or the second translational movement according to the second distance. In some embodiments, the positioning mechanism may be configured to move the image capturing mechanism only by rotation without translational movement. Thus, calculating the motion parameters of the positioning mechanism can include calculating the first rotation angle according to the first distance and calculating the second rotation angle according to the second distance. In some other embodiments, the positioning mechanism may be configured to move the image capturing mechanism only by translational movement without rotation. Thus, calculating the motion parameters of the positioning mechanism can include calculating the first translational movement distance according to the first distance and calculating the second translational movement distance according to the second distance.

In some embodiments, the first distance can be measured based on the number of pixels between the current position and the target position in the first direction. Similarly, the second distance can be measured based on the number of pixels between the current position and the target position in the second direction. The first rotation angle and/or the first translational movement distance can be, for example, proportional to the first distance. The second rotation angle and/or the second translational movement distance can be, for example, proportional to the second distance.

In the above embodiments, some exemplary movements of the positioning mechanism are described, i.e., the rotation in the first rotation direction (e.g., the rotation around the yaw axis), the rotation in the second rotation direction (e.g., the rotation around the pitch axis), the translational movement along the first translation direction (e.g., the x-direction in the positioning mechanism coordinate system), and the translational movement along the second translation direction (e.g., the y-direction in the positioning mechanism). In some embodiments, to position the detected human face at the target position, the positioning mechanism can additionally or alternatively rotate in a third rotation direction, e.g., rotate around a roll axis of the positioning mechanism, which is perpendicular to the yaw and pitch axes. Correspondingly, the one or more motion parameters of the positioning mechanism can additionally or alternatively include a third rotation angle of the positioning mechanism around the roll axis.

Figure 5B:
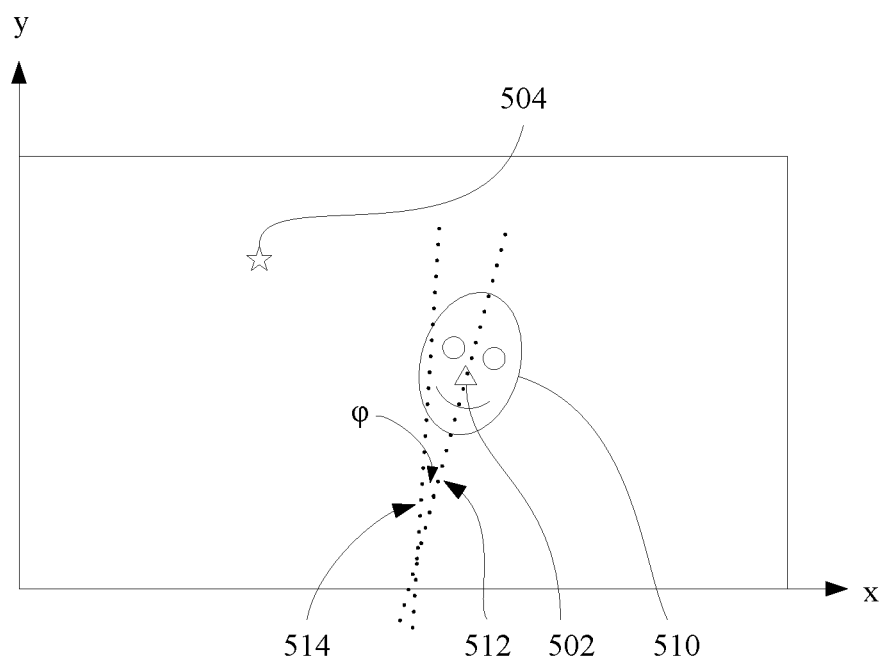

In some embodiments, the detected human face may not be oriented in a correct or desired direction in the imaging frame. FIG. 5B schematically shows an imaging frame illustrating another exemplary positional relationship between the current position and the target position consistent with the disclosure. As shown in FIG. 5B, the detected human face 510 is oriented along a detected orientation 512, which is different from a target, or desired, orientation 514. Thus, in addition to being moved to the target position 504, the detected human face 510 may also need to be rotated to align with the target orientation 514. The target orientation may or may not be parallel to the u-direction or the v-direction in the imaging frame coordinate system.

In this situation, the positional relationship between the current position 502 and the target position 504 can include a relative angle (angle φ shown in FIG. 5B) between the detected orientation 512, i.e., the orientation of the detected human face, and the target orientation 514. The positional relationship can further include first coordinate parameters of the current position 502 in the imaging frame coordinate system and second coordinate parameters of the target position 504 in the imaging frame coordinate system. In some embodiments, as shown in FIG. 5B, the imaging frame coordinate system can be defined using an x-coordinate axis and a y-coordinate axis perpendicular to each other. In the example shown in FIG. 5B, the origin of the imaging frame coordinate system is arranged at a corner point of the imaging frame, but the origin can also be arranged at another location. The first coordinate parameters can include a first x-coordinate and a first y-coordinate of the current position 502. The second coordinate parameters can include a second x-coordinate a second y-coordinate of the target position 504.

As described above, the imaging control apparatus can control the positioning mechanism to rotate around the yaw axis and/or move along the x-direction in the positioning mechanism coordinate system so as to cause the detected human face to move along the u-direction in the imaging frame coordinate system, and control the positioning mechanism to rotate around the pitch axis and/or move along the y-direction in the positioning mechanism coordinate system so as to cause the detected human face to move along the v-direction in the imaging frame coordinate system. Due to the misalignment between the detected orientation 512 and the target orientation 514, in addition to the above-described movements, the imaging control apparatus can also control the positioning mechanism to rotate around the roll axis of the positioning mechanism, so as to change the orientation of the detected human face.

In these embodiments, the motion parameters of the positioning mechanism can include the at least one of the first rotation angle of the positioning mechanism around the yaw axis or the first translational movement distance of the positioning mechanism in the x-direction in the positioning mechanism coordinate system, at least one of the second rotation angle of the positioning mechanism around the pitch axis or the second translational movement distance of the positioning mechanism in the y-direction in the positioning mechanism coordinate system, and a third rotation angle of the positioning mechanism around the roll axis. These motion parameters can be calculated based on the relative angle φ, the first coordinate parameters of the current position 502, and the second coordinate parameters of the target position 504.

That is, in these embodiments, calculating the motion parameters of the positioning mechanism (406 in FIG. 4) can include calculating at least one of the first rotation angle or the first translational movement distance, at least one of the second rotation angle or the second translational movement, and the third rotation angle based on the relative angle, the first coordinate parameters, and the second coordinate parameters. Further, in some embodiments, the positioning mechanism is configured to move the image capturing mechanism only by rotation without translational movement. Thus, calculating the motion parameters of the positioning mechanism can include calculating the first rotation angle, the second rotation angle, and the third rotation angle based on the relative angle, the first coordinate parameters, and the second coordinate parameters.

For example, the positioning mechanism may first need to be rotated around the roll axis for the third rotation angle to align the detected human face along the target orientation, and then rotate around the yaw axis for the first rotation angle and around the pitch axis for the second rotation angle, respectively, to move the detected human face to the target position in the imaging frame. In this example, the third rotation angle can equal the relative angle. After the rotation around the roll axis, the coordinate parameters of the target position in the imaging frame coordinate system do not change, but the detected human face can be moved to an intermediate position having third coordinate parameters in the imaging frame coordinate system. The third coordinate parameters can be calculated based on the second coordinate parameters, coordinate parameters of the roll axis in the imaging frame coordinate system, and the third rotation angle, i.e., the relative angle in this example. The first and second rotation angles can be calculated based on the third coordinate parameters and the first coordinate parameters.

After the one or more motion parameters are determined, the positioning mechanism is moved according to the motion parameters. That is, the imaging control apparatus can generate motion control instructions based on the one or more motion parameters, and output the motion control instructions to the positioning mechanism to cause the positioning mechanism to move accordingly. For example, the motion control instructions can cause the positioning mechanism to rotate around the yaw axis for the first rotation angle, around the pitch axis for the second rotation angle, and/or around the roll axis for the third rotation angle. In some embodiments, the positioning mechanism may need to perform one or more rotational movements and/or one or more translational movements to position the detected human face at the target position and/or aligned with the target orientation. The positioning mechanism can perform needed movements in any suitable order. For example, the positioning mechanism may first move along the first translation direction for the first translational movement distance and/or along the second translation direction for the second translational movement distance, and then rotate around the yaw axis for the first rotation angle and/or around the pitch axis for the second rotation angle.

Referring again to FIG. 2, at 210, an image containing the detected human face is recorded after the detected human face is positioned at the target position. As described above, the image can be, for example, a still image, i.e., a picture, or a moving image, i.e., a video. When a moving image is recorded, audio data associated with the moving image can also be recorded using, for example, a microphone on the image capturing mechanism or the positioning mechanism. As used herein, "recording" an image may refer to triggering a shutter of the image capturing mechanism and causing the sensor of the image capturing mechanism to convert received light to electronic data and to send the electronic data for storing in a storage medium, such as the memory of the imaging system. In some embodiments, the imaging control apparatus can output a recording instruction to trigger the shutter of the image capturing mechanism to record the image.

In some embodiments, the user can directly trigger the shutter of the image capturing mechanism. In some embodiments, the shutter of the image capturing mechanism may be coupled to a control button on the positioning mechanism, and the user can trigger the shutter by pressing the control button on the positioning mechanism. In some embodiments, the image capturing mechanism and the positioning mechanism may be mounted on a mobile vehicle, and the shutter of the image capturing mechanism may be coupled to a control button on a remote controller of the mobile vehicle. The user can trigger the shutter by pressing the control button on the remote controller.

In some embodiments, the image can be recorded according to a voice instruction. The voice instruction can be a voice from the user containing a key word. For example, the voice can be detected using a microphone installed on the image capturing mechanism or the positioning mechanism. The imaging control apparatus can receive the detected voice and recognize the voice to determine whether the voice contains the key word. If the voice contains the key word, the imaging control apparatus can output an instruction to trigger the shutter of the image capturing mechanism to record the image.

In some embodiments, the image can be recorded according to a motion instruction. The motion instruction can be a motion containing a gesture performed by the user. For example, the motion can be detected using the image capturing mechanism or a separate device. The imaging control apparatus can receive the detected motion and determine whether the motion contains the gesture. If the motion contains the gesture, the imaging control apparatus can output an instruction to trigger the shutter of the image capturing mechanism to record the image.

In some embodiments, the image can be recorded automatically when a certain condition is met. For example, the image can be recorded when a target facial expression is detected on the detected human face. The target facial expression can be, e.g., a smile, an eye contact with the image capturing mechanism, or a mouth shape associated with a certain phrase, such as the word "cheese."

In some embodiments, not any smile can trigger the recording of the image, but a certain smile can trigger the recording of the image. The certain smile can be determined, e.g., through machine learning. For example, a smile model, e.g., a model based on the smiles of the owner of the imaging system, can be used to train the imaging control apparatus. In use, when the imaging control apparatus detects the certain smile, the imaging control apparatus can trigger the recording of the image.

Figure 6:
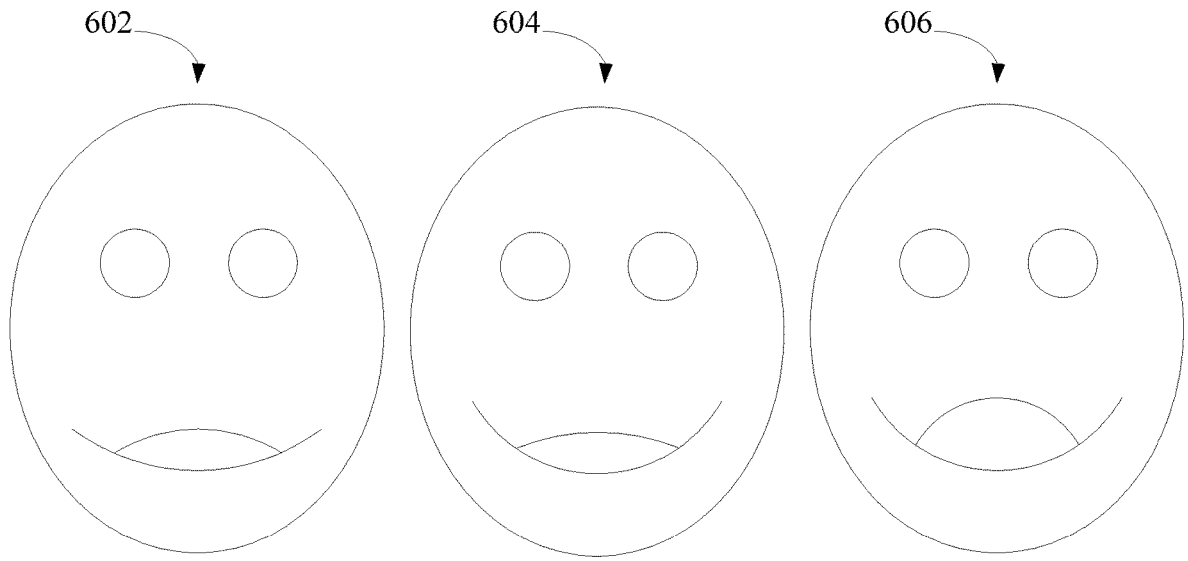
FIG. 6 schematically shows human faces with different degrees of smile strength according to an exemplary embodiment of the disclosure.

In some embodiments, a smile with a certain degree of smile strength can trigger the recording of the image. The smile strength may be determined based on, for example, how high the corners of the mouth are pulled up and/or how wide the mouth is opened. FIG. 6 schematically shows three exemplary human faces with different degrees of smile strength. As shown in FIG. 6, the mouths on human face 602 and human face 604 are opened for about the same degree, but the corners of the mouth on the human face 604 are pulled up higher. Thus, the human face 604 may be determined to have a higher degree of smile strength than the human face 602. Further, the corners of the mouth on the human face 604 and the corners of the mouth on human face 606 are pulled up to about the same height, but the mouth on the human face 606 is opened wider. Thus, the human face 606 may be determined to have a higher degree of smile strength than the human face 604. The smile strength may be determined based on other features such as, for example, how wide the eyes of the user are opened.

In these embodiments, the imaging control apparatus can detect the degree of smile strength based on the detected human face and determine whether the degree of smile strength is higher than a threshold value. For example, the human face 604 shown in FIG. 6 may represent the threshold value of the smile strength. That is, the degree of smile strength of the human face 602 is lower than the threshold value and the degree of smile strength of the human face 606 is higher than the threshold value. Further, if the degree of smile strength on the detected human face is higher than the threshold value, the imaging control apparatus can output an instruction to trigger the shutter of the image capturing mechanism to record the image.

Figure 7:
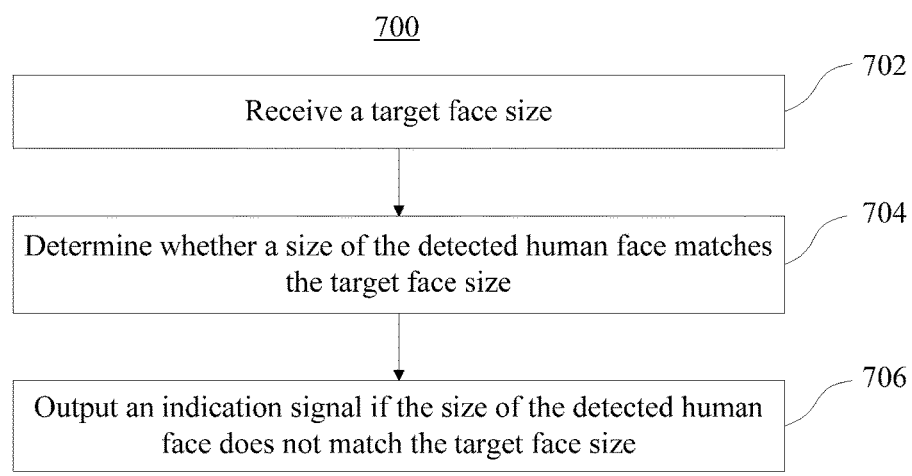
FIG. 7 is a flow chart showing a prompting method according to an exemplary embodiment of the disclosure.

In some embodiments, the imaging system can include a screen that can face or be rotated to face the user when the user is taking a selfie. The user can "preview" the image to be captured on the screen and decide when to trigger the shutter to record the image. In some embodiments, the imaging system does not include such a screen or the screen is too small for the user to clearly see the preview at a distance, and thus a different means may be needed to prompt the user of a proper time to record the image. FIG. 7 is a flow chart showing an exemplary prompting method 700 consistent with the disclosure. Each of the processes shown in FIG. 7 can be performed before, between, or after the processes for imaging shown in FIG. 2.

As shown in FIG. 7, at 702, a target face size is received. The target face size can be a default face size or a face size pre-set by the user before using the imaging system to capture images. In some embodiments, a face thumbnail can be used and a size of the face thumbnail can represent the target face size. The face thumbnail can be a default face thumbnail or be selected by the user from a plurality of candidate face thumbnails. In some embodiments, the face thumbnail can be placed at the target position shown on the screen of the imaging system.

At 704, whether a size of the detected human face matches the target face size is determined. In the embodiments using the face thumbnail, the determination includes determining whether the size of the detected human face matches the size of the face thumbnail.

At 706, if the size of the detected human face does not match the target face size, e.g., the size of the face thumbnail, an indication signal is output to inform the user that an adjustment may be needed. For example, a distance between the image capturing mechanism and the user may need to be adjusted. The user can either move him/herself or move the image capturing mechanism, e.g., by moving the positioning mechanism, to adjust the distance to the image capturing mechanism. In some embodiments, the indication signal can be continuously output until the size of the detected human face matches the target size, e.g., the size of the face thumbnail.

The indication signal can include one or more of various means, such as a sound indication and a light indication. For example, the imaging control apparatus can control a sound generating device, such as a speaker, on the image capturing mechanism or the positioning mechanism to output a sound as the indication signal. The sound can continue until the size of the detected human face matches the target size. As another example, the imaging control apparatus can control an indication light on the image capturing mechanism or the positioning mechanism to turn on or to flash as the indication signal. The indication light can continue to be on or to flash until the size of the detected human face matches the target size.

In some embodiments, adjusting the distance between the image capturing mechanism and the user can be performed automatically by the positioning mechanism without the user participation, and thus the indication signal may not be needed. For example, the positioning mechanism can include a translation driver configured to move the image capturing mechanism along a normal direction perpendicular to the plane defined by the x-direction and the y-direction in the positioning mechanism coordinate system. The imaging control apparatus can control the positioning mechanism to move the image capturing mechanism toward or away from the user along the normal direction until the size of the detected human face matches the target size. This method can be combined with the indication signal method in case the range of movement of the image capturing mechanism along the normal direction is limited. As another example, the positioning mechanism can be a gimbal mounted on a mobile vehicle. The imaging control apparatus can also control the mobile vehicle to move toward or away from the user until the size of the detected human face matches the target size.

In some embodiments, during the recording of a moving image, the user may move away from his/her initial position when the recording started. The imaging control apparatus can continuously perform the imaging method consistent with the disclosure, such as one of the above-described exemplary imaging method, to move the positioning mechanism to "track" the user and maintain the detected human face at the target position in the imaging frame.

In some embodiments, the imaging control apparatus can further process recorded images. For example, when group photos including several persons are taken, it may be possible that not everyone has the best smile in the same photo. Thus, a series of group photos can be taken during a certain period of time. The imaging control apparatus can analyze the series of group photos, extract the portion with the best smile for each of the persons from the series of group photos, and combine the extracted portions to form a new photo. As such, a combined photo containing the best smile for each person can be obtained.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. An imaging method comprising:
   determining a target position in an imaging frame of an image capturing mechanism connected with a positioning mechanism;
   outputting, after the target position is determined, a capturing instruction to control the image capturing mechanism to capture a scene including a human face;
   detecting the human face from the captured scene;
   determining a current position of the detected human face in the imaging frame;
   calculating a positional relationship between the current position and the target position, including:
      calculating a first distance between the current position and the target position along a first direction of the imaging frame; and
      calculating a second distance between the current position and the target position along a second direction of the imaging frame, the second direction being perpendicular to the first direction;
   calculating motion parameters of the positioning mechanism according to the positional relationship, including:
      calculating a first rotation angle of the positioning mechanism around a yaw axis according to the first distance; and
      calculating a second rotation angle of the positioning mechanism around a pitch axis according to the second distance; and
   outputting a control instruction to move the positioning mechanism to move the image capturing mechanism according to the motion parameters so as to position a facial feature of the detected human face at the target position, the facial feature including an eye, a nose, an ear, or a mouth of the detected human face.

2. The imaging method of claim 1, wherein determining the target position includes at least one of:
   determining a preset default position in the imaging frame as the target position; or
   displaying the imaging frame on a screen and receiving an input indicating the target position in the imaging frame.

3. The imaging method of claim 1, wherein determining the target position includes:
   receiving a sample image containing a sample face;

detecting a position of the sample face in the sample image; and determining the target position according to the position of the sample face.

4. The imaging method of claim 1, wherein determining the target position includes:

receiving a plurality of sample images each containing a sample face;

detecting a position of the sample face in each of the sample images; and calculating the target position according to the positions of the sample faces.

5. The imaging method of claim 1, wherein determining the target position includes:

receiving a composition template containing a face position; and determining the face position as the target position.

6. The imaging method of claim 1, wherein determining the target position includes:

receiving a plurality of composition templates each containing a face position;

receiving an input selecting one of the composition templates; and determining the face position of the selected composition template as the target position.

7. An imaging method comprising:

determining a target position in an imaging frame of an image capturing mechanism connected with a positioning mechanism;

outputting, after the target position is determined, a capturing instruction to control the image capturing mechanism to capture a scene including a human face;

detecting the human face from the captured scene;

determining a current position of the detected human face in the imaging frame;

calculating a positional relationship between the current position and the target position, including:

determining a relative angle between an orientation of the detected human face and a target orientation;

determining first coordinate parameters of the current position in a coordinate system of the imaging frame; and determining second coordinate parameters of the target position in the coordinate system, calculating motion parameters of the positioning mechanism, including:

calculating a first rotation angle of the positioning mechanism around a yaw axis, a second rotation angle of the positioning mechanism around a pitch axis, and a third rotation angle of the positioning mechanism around a roll axis based on the relative angle, the first coordinate parameters, and the second coordinate parameters; and outputting a control instruction to move the positioning mechanism to move the image capturing mechanism according to the motion parameters so as to position a facial feature of the detected human face at the target position, the facial feature including an eye, a nose, an ear, or a mouth of the detected human face.

8. The imaging method of claim 1, wherein detecting the human face includes:

detecting a plurality of candidate faces; and determining the detected human face from the candidate faces.

9. The imaging method of claim 8, wherein determining the detected human face from the candidate faces includes:

comparing the candidate faces with a stored user face; and determining one of the candidate faces that matches the stored user face as the detected human face.

10. The imaging method of claim 1, further comprising:

placing a face thumbnail at the target position;

determining whether a size of the detected human face matches a size of the face thumbnail; and instructing, if the size of the detected human face does not match the size of the face thumbnail, to output an indication signal.

11. The imaging method of claim 10, further comprising:

continuously instructing to output the indication signal until the size of the detected human face matches the size of the face thumbnail.

12. The imaging method of claim 1, further comprising:

recording, after the detected human face is positioned at the target position, a picture or a video containing the detected human face.

13. The imaging method of claim 12, wherein recording the picture or the video includes recording the picture or the video according to a voice instruction.

14. The imaging method of claim 12, wherein recording the picture or the video includes recording the picture or the video when a target facial expression is detected on the detected human face.

15. The imaging method of claim 14, wherein recording the picture or the video when the target facial expression is detected includes recording the picture or the video when a smile on the detected human face is detected.

16. The imaging method of claim 12, wherein recording the picture or the video includes:

detecting a degree of smile strength based on the detected human face;

determining whether the degree of smile strength is higher than a threshold value; and triggering, if the degree of smile strength is higher than the threshold value, a shutter of the image capturing mechanism to record the picture or the video.

17. An imaging control apparatus comprising:

a processor; and a memory storing computer program codes that, when executed by the processor, control the processor to:

determine a target position in an imaging frame of an image capturing mechanism connected with a positioning mechanism;

output, after the target position is determined, a capturing instruction to control the image capturing mechanism to capture a scene including a human face;

detect the human face from the captured scene;

determine a current position of the detected human face in the imaging frame;

calculate a positional relationship between the current position and the target position, including:

calculating a first distance between the current position and the target position along a first direction of the imaging frame; and calculating a second distance between the current position and the target position along a second direction of the imaging frame, the second direction being perpendicular to the first direction;

calculate motion parameters of the positioning mechanism according to the positional relationship, including:

calculating a first rotation angle of the positioning mechanism around a yaw axis according to the first distance; and calculating a second rotation angle of the positioning mechanism around a pitch axis according to the second distance; and output a control instruction to move the positioning mechanism according to the motion parameters so as to position a facial feature of the detected human face at the target position, the facial feature including an eye, a nose, an ear, or a mouth of the detected human face.

* * * * *